Patented July 20, 1943

2,324,693

UNITED STATES PATENT OFFICE 2,324,693

TRANSMISSION

Walter R. Griswold, Detroit, and Forest R. McFarland, Huntington Woods, Mich., assignors to Packard Motor Car Company, Detroit, Mich., a corporation of Michigan Application November 19, 1941, Serial No. 419,748

19 Claims. (Cl. 192—.01)

This invention relates to transmissions and more particularly to transmissions for motor driven vehicles in which some form of hydraulic coupling is employed.

In transmissions employing fluid in the power drive train, difficulty has been experienced in entirely disconnecting the drive from the impeller to the driven shaft while the driving shaft is rotating because of fluid drag. A clutch has been employed to connect and disconnect the drive to the fluid coupling impeller, but time is required for the impeller to slow down so that the power to the driven shaft is cut off.

It is an object of this invention to provide a transmission of the character referred to in which provision is made to quickly and entirely cut off the drive to the driven shaft.

Another object of the invention is to provide a transmission for motor vehicles in which the drive through a fluid coupling can be controlled by the engine throttle control mechanism.

Another object of the invention is to provide a transmission for motor vehicles in which the drive through a fluid coupling is controlled by a speed responsive device.

A further object of the invention is to provide a transmission for a motor vehicle in which a fluid drive can be quickly established or entirely cut off by electromagnetically operated means under the control of a governor and the accelerator pedal for the vehicle engine throttle valve.

Another object of the invention is to provide a transmission in which drive through a torque converter can be cut off by means which leaves the change speed gearing driven by the converter free to operate without possibility of torque load being applied to the gearing by creep of the vehicle on an incline.

Other objects of the invention will appear from the following description taken in connection with the drawing, which forms a part of this specification, in which:

Fig. 1 is a fragmentary elevational view of a motor vehicle having a transmission incorporating the invention;

Fig. 2 is a fragmentary vertical sectional view of a transmission having the invention incorporated therewith;

Fig. 3 is a diagrammatic view of the control system for the clutch and brake;

Fig. 4 is a semi-diagrammatic view taken substantially on line 4—4 of Fig. 2.

In Fig. 1 is shown a portion of a motor vehicle having a floor 10, a dash 11 and a toe board 12. A conventional type of internal combustion engine 13 is arranged in advance of the dash and secured thereto is a transmission 14. Provision is made for controlling the engine by a driver operated accelerator pedal 15 mounted on the toe board that is connected with the throttle valve 16 by mechanism 17. The throttle valve is in engine idling position when the pedal is released by the vehicle driver and is opened when the pedal is pressed toward the toe board.

The transmission is driven by a driving shaft 18 operated by the engine, which can be the crankshaft. Tail shaft 19 can be connected for forward or reverse drive by the driven shaft 20 and a fluid coupling 21, which can be a hydraulic torque converter, is connected in driving relation with the driven shaft. The converter can be of a conventional type consisting of an impeller 22, a driven member 23 fixed to the driven shaft and a stator 24. Cooperating with the stator is a sleeve 25, splined to a wall 26 fixed to the transmission casing wall 27 by bolts 28, and an overrunning one-way clutch 29 of a conventional type.

Mechanism is provided for driving the impeller from the driving shaft and includes clutch means. A flywheel 30 is fixed to the driving shaft by bolts 31, a disk member 32 is arranged parallel with the flywheel and the flywheel and disk member are fixed to a ring member 33 by bolts 34. Such driving mechanism encases the torque converter. A clutch ring 35 is arranged adjacent the disk member and is secured to the impeller by a flexible disk 36. The driving couple between the impeller and the drive mechanism rotated by the engine is established by holding clutch ring 35 with disk member 32.

Brake means is provided to hold or release the impeller. A sleeve 37 is rotatably mounted on sleeve 25 and serves as a bearing for disk member 32. This sleeve 37 and the disk 36 are secured to the impeller by rivets 38 and splined on the rear end of the sleeve is a brake hub 39 having a flexible disk 40 riveted thereto. The disk 40 carries a brake ring 41 that is adapted to be held against wall 42 secured to wall 27 by the bolts 28.

The coupling for establishing forward or reverse drive between the driven shaft and the tail shaft consists of planetary gearing and control means. The sun gear 50 of the planetary gearing has a sleeve portion 51 splined to the rear end of the driven sleeve shaft 20 and a ring gear 52 is splined to the tail shaft. Planet gears 53 mesh with the sun gear and the ring gear and are rotatably mounted on pins 54 fixed to a carrier 55 axially shiftable on the sun gear sleeve. Fixed to the front end of the carrier is a toothed member 56 that can be moved into engagement with the sun gear and ring gear to lock the planetary gearing for forward drive, or into engagement with teeth on a brake ring 57 fixed to the transmission casing to establish reverse drive. The member 56 can be positioned between the brake ring 57 and the sun and ring gears for disconnecting the drive, and the carrier can be shifted axially by a suitable fork 59 fixed to shaft 60 operable by the shift lever 61 through suitable mechanism (not shown). A bearing shaft 63 extends through the sleeve driven shaft and the sun gear sleeve.

The clutch means and the brake means are controlled to be engaged and disengaged alternately, so that the brake will be applied when the clutch is released and the brake will be released when the clutch is engaged. The clutch means and the brake means are preferably electromagnetically controlled through circuits controlled by a governor and the accelerator pedal. A magnet coil 65 is carried by the disk member 32 of the impeller drive mechanism and is connected to contact ring 66 engaged by a conductor 67 extending into the transmission casing. A magnet coil 68 is carried by brake wall 42 and is connected with terminal post 69. The coils 65 and 68 are grounded through the transmission casing.

The coils 65 and 68 are connected with a source of electric energy and are preferably connected in series with the engine ignition system. The engine ignition circuit is conventional and includes battery 70, conductor 71 leadng from the battery, switch 72 and conductor 73 leading to the engine sparking system. Governor controlled switch 74 and accelerator pedal controlled switch 75 control transmission of energy to the magnet coils. The governor switch has two pair of terminals 76, 77 and 78, 79, and the switch 75 also has two pair of terminals 80, 81 and 82, 83. A movable switch contact member 84 is actuated by the governor weights 184 connected to shaft 185 driven by gear 186 meshing with gear 85 fixed on the tail shaft. The switch 75 includes a pair of spaced contact disks 86, 87 mounted on stem 88 connected by link 89 with the throttle valve actuating mechanism 17. Conductor 90 leads from the ignition switch 72 to governor switch terminal 76 and to terminals 81 and 83 of the accelerator controlled switch. Governor switch terminal 77 is connected with terminal 80 of switch 75 by conductor 91 and such conductor is connected with terminal 67 of magnet 65 by conductor 92. Governor switch terminal 79 is connected with terminal 69 of magnet 68 by conductor 93 and governor switch terminal 78 is connected with terminal 82 of switch 75 by conductor 94.

In order to energize the magnet coils, it is necessary for the engine ignition switch to be closed. The arrangement of the accelerator pedal controlled switch is such that disk 86 will engage terminals 82, 83 when the accelerator is entirely released, and will so remain until the accelerator pedal has been pressed down slightly. The disks 86 and 87 are free on stem 88 and are arranged between suitable abutments 95 with a coil spring 96 urging them apart. When the accelerator pedal is released disk 86 will be spaced from its abutment and will seat against terminals 82, 83 and will so remain until link 89 is moved upwardly by depression of the accelerator pedal. When the disk 86 engages terminals 82, 83 current will flow from conductor 90 to conductor 94 and the governor switch terminals 78, 79 being connected by the switch member 84 below some predetermined vehicle speed, such as three miles per hour, current will flow through conductor 93 to coil 68 which will cause the brake 41 to be held against wall 42 and thereby hold the impeller 22 of the torque converter stationary. During such condition no current can flow to coil 65 so clutch 35 is released and the impeller will not be driven. This holding of the impeller, when the drive is released, will prevent rotation of the impeller due to slow clutch release because of magnetic flux or because of fluid drag in the converter.

When the vehicle speed is above the predetermined governor control speed, the movable governor switch member will shift away from terminals 78, 79 and will connect terminals 76, 77 to thus energize coil 65 through conductors 90, 91, 92, 67 and ring 66 and thereby engage the clutch. The circuit to coil 68 is thus broken to release the brake prior to engagement of the clutch. The coil 65 can also be energized by pressing down on the accelerator pedal to shift disk 87 into contact with terminals 80, 81 but before such contact is established disk 86 will be moved away from terminals 82, 83 thus breaking the circuit to coil 68. Current will flow from conductor 90 through terminals 81, 80 to conductors 92, 67 and 66 when disk 87 is moved to engage terminals 80, 81. The driver can thus operate the accelerator pedal to alternately energize coils 65 and 68.

The governor switch will overrule the accelerator pedal operated switch so that the power train through the torque converter will not be broken by release of the accelerator pedal above the governed speed of three miles per hour. There can thus be no free wheeling of the transmission except as dictated by the governor. Above the governed speed, the terminals 78, 79 will be open so that the brake cannot be engaged and current will flow through terminals 76, 77 to complete the circuit to coil 65 regardless of the accelerator pedal controlled switch position. Below the governed speed, the accelerator pedal operated switch will control and the brake and clutch can be alternately engaged to suit operating conditions.

When the impeller is held stationary by brake 41, the driven converter member can rotate so that torque applied to the planetary gearing by the vehicle driving wheels, when creeping on an incline, will leave the gearing free of torque load that would otherwise act to oppose shifting of the gearing.

Although the invention has been described in connection with a specific embodiment, the principles involved are susceptible of numerous other applications which will readily occur to persons skilled in the art. The invention is therefore to be limited only as indicated by the scope of the appended claims.

What we claim is:

1. A transmission comprising a driving shaft, a driven shaft, a hydraulic torque converter having an impeller, a driven member fixed to the driven shaft and a stator member, a driving connection from the driving shaft to the impeller including a magnetically engageable clutch, and means for braking said impeller when the clutch is demagnetized.

2. A transmission comprising a driving shaft, a driven shaft, a hydraulic torque converter having an impeller, a driven member fixed to the driven shaft and a stator, a driving connection from the driving shaft to the impeller including a clutch, and a magnetically actuated brake for holding said impeller when said clutch is released.

3. A transmission comprising a driving shaft, a driven shaft, a hydraulic torque converter having an impeller, a driven member fixed to the driven shaft and a stator, a driving connection from the driving shaft to the impeller including a magnetically engaged clutch, and a magnetically actuated brake for holding said impeller when said clutch is demagnetized.

4. A transmission comprising a casing, a driving shaft extending into the casing, a driven shaft extending into the casing, a hydraulic torque converter having an impeller, a driven member fixed to the driven shaft and a stator, drive mechanism operable to connect the driving shaft with the impeller including a controlled clutch, a brake member fixed to rotate with the impeller and shiftable to engage the casing, and means for shifting said brake member to engage said casing when the clutch is released and to disengage the brake member when said clutch is engaged.

5. A transmission comprising a driving shaft, a driven shaft, a hydraulic torque converter having an impeller, a driven member fixed to the driven shaft and a stator, drive mechanism including a magnetically engaged clutch for connecting the driving shaft with the impeller, a magnetically affixed brake for holding said impeller, circuit means for the magnetic clutch and brake, and circuit control means operative to make the clutch circuit when the brake circuit is broken and to make the brake circuit when the clutch circuit is broken.

6. In a transmission for driving a motor vehicle, a driving shaft, a driven shaft, a hydraulic torque converter connected in driving relation with the driven shaft and including an impeller, drive mechanism for connecting the driving shaft with the impeller including a clutch, means for braking the impeller, electromagnetic means operable to control said clutch and said brake, and driver actuated means operable to control said electromagnetic means.

7. In a transmission for driving a motor vehicle having an internal combustion engine and driver operable engine throttle control means, an engine operated driving shaft, a driven shaft, a hydraulic torque converter connected in driving relation with the driven shaft and including an impeller, drive mechanism including a clutch for connecting the driving shaft with the impeller, means for braking the impeller, electromagnetic means operable to control said clutch and said brake, and control means for the electromagnetic means responsive to movement of the engine throttle control means.

8. In a transmission for driving a motor vehicle having an internal combustion engine and driver operable engine throttle control means, an engine operated driving shaft, a driven shaft, a hydraulic torque converted including an impeller connected in driving relation with the driven shaft, drive mechanism including clutch means for connecting the driving shaft with the impeller, brake means for the impeller, and means controlled by said throttle control means operable to alternately engage and release said clutch means and said brake means.

9. In a transmission for driving a motor vehicle, a driving shaft, a driven shaft, a torque converter connected to drive said driven shaft and including an impeller, mechanism including clutch means for driving the torque converter impeller from the driving shaft, brake means for the impeller, means operable to alternately engage said clutch means and said brake means, and a governor for controlling said engaging means.

10. In a transmission for driving a motor vehicle, a driving power shaft, a driven shaft, a hydraulic torque converter connected in driving relation with said driven shaft and including an impeller, mechanism including clutch means for driving the impeller from the driving shaft, brake means for the impeller, means operable to alternately engage said clutch means and said brake means, and means responsive to the speed of one of the shafts for controlling said engaging means.

11. In a transmission for driving a motor vehicle having an internal combustion engine and driver operable engine throttle control means, an engine operated driving shaft, a driven shaft, a hydraulic coupling connected in driving relation with said driven shaft and including an impeller, mechanism including clutch means for driving the impeller from the driving shaft, brake means for the impeller, and means operable by the throttle control means for controlling actuation of said brake means.

12. In a transmission for driving a motor vehicle having an internal combustion engine and driver operable engine throttle control means, an engine operated driving shaft, a driven shaft, a hydraulic coupling connected in driving relation with said driven shaft and including an impeller, mechanism including clutch means for driving the impeller, electromagnetic means operable to actuate said clutch means, and control means for the electromagnetic means operable by the throttle control means.

13. In a transmission for driving a motor vehicle having an internal combustion engine and driver operable engine throttle control means, an engine operated driving shaft, a driven shaft, a hydraulic coupling connected in driving relation with the driven shaft and including an impeller, mechanism including clutch means for driving the impeller from the driving shaft, brake means for the impeller, electromagnetic means for actuating the brake means, and means operable by the throttle control means for controlling said electromatic means.

14. In a transmission for driving a motor vehicle having an internal combustion engine and driver operable engine throttle control means, an engine operated driving shaft, a driven shaft, a hydraulic coupling connected in driving relation with said driven shaft and including an impeller, mechanism including clutch means for driving the impeller from the driving shaft, brake means for the impeller, electromagnetic means for actuating said clutch means and said brake means, a control means for the electromagnetic means actuated by said throttle control means, and a governor control means for the electromagnetic means.

15. In a transmission for driving a motor vehicle having an internal combustion engine and driver operable engine throttle control means, an engine operated driving shaft, a driven shaft, a hydraulic coupling connected in driving relation with the driven shaft and including an impeller, mechanism including clutch means for driving the impeller from the driving shaft, brake means for the impeller, electromagnetic means operable to alternately engage the clutch means and the brake means, a vehicle operated governor controlling the electromagnetic means to engage the brake means below a predetermined speed and to engage the clutch means above such speed, and means actuated by the throttle control means to engage the brake means and release the clutch means during a predetermined low range of throttle opening and to release the brake means and engage the clutch means above the predetermined low range of throttle opening, said throttle control actuated means being overruled by the governor to prevent clutch means disengagement above the predetermined low range of throttle opening.

16. In a transmission for driving a motor vehicle having an internal combustion engine and driver operable engine throttle control means, an engine operated driving shaft, a hydraulic torque converter connected in driving relation with the driven shaft and including an impeller, mechanism including clutch means for driving the impeller from the driving shaft, a brake for the impeller, electromagnetic means operable to alternately engage and release said clutch means and said brake means including two pair of switches, a governor responsive to vehicle speed for operating one of the pair of switches, and means operated by the throttle control means for operating the other pair of switches, said governor acting to engage the brake means below a predetermined speed and to engage the clutch means above such speed, and said throttle operated means acting to engage the brake means during a low range of throttle opening and to engage the clutch means above such range of throttle opening, said governor operated switches overruling the throttle operated switches when in conflict.

17. In a transmission for driving a motor vehicle, a power operated driving shaft, a driven shaft, a hydraulic torque converter connected in driving relation with the driven shaft and including an impeller, mechanism including a clutch for driving the impeller from the driving shaft, a brake for holding the impeller, electromagnetic means for alternately engaging and releasing the clutch and the brake, and governor means responsive to vehicle speed for controlling said electromagnetic means, said brake being applied below and the clutch released below a predetermined speed and the clutch being engaged and the brake released above such predetermined speed.

18. In a transmission for driving a motor vehicle having an internal combustion engine and an accelerator pedal operated mechanism for controlling the engine throttle valve, an engine operated driving shaft, a driven shaft, a hydraulic torque converter connected in driving relation with the driven shaft and including an impeller, mechanism including a clutch for driving the impeller from the driving shaft, a brake for holding the impeller, electromagnetic means operable to engage said clutch and said brake alternately, and control means for the electromagnetic means operable by said accelerator pedal to release the clutch and apply the brake below a predetermined throttle valve opening and to engage the clutch and release the brake above the predetermined throttle valve opening.

19. In a transmission, a driving shaft, a driven shaft, a hydraulic coupling connected to drive said driven shaft and including an impeller, mechanism including a clutch medium for driving the impeller from the driving shaft, a brake medium for holding the impeller, and control means operable to actuate said mediums whereby when either one is engaged the other will be disengaged.

WALTER R. GRISWOLD.
FOREST R. McFARLAND.